J. RYAN.
Steam-Trap.

No. 202,759.　　　Patented April 23, 1878.

Witnesses:
Chas. F. Meisner.
J. W. Herthel.

Inventor:
Joseph Ryan
per Herthel & Co.
Att'ys.

UNITED STATES PATENT OFFICE.

JOSEPH RYAN, OF ST. LOUIS, MISSOURI.

IMPROVEMENT IN STEAM-TRAPS.

Specification forming part of Letters Patent No. 202,759, dated April 23, 1878; application filed November 10, 1875.

*To all whom it may concern:*

Be it known that I, JOSEPH RYAN, of St. Louis, Missouri, have invented an Improved Steam-Trap, of which the following is a specification:

This invention is an apparatus for effecting the discharge of the condensed water in steam-pipes or similar connections to steam-engines, heaters, &c.

This invention will first be fully described, and hereinafter pointed out in the claims.

Figure 1:
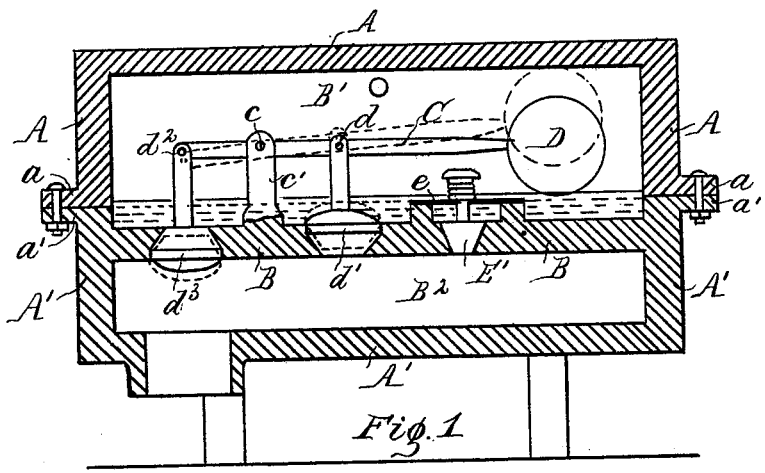
Figure 2:
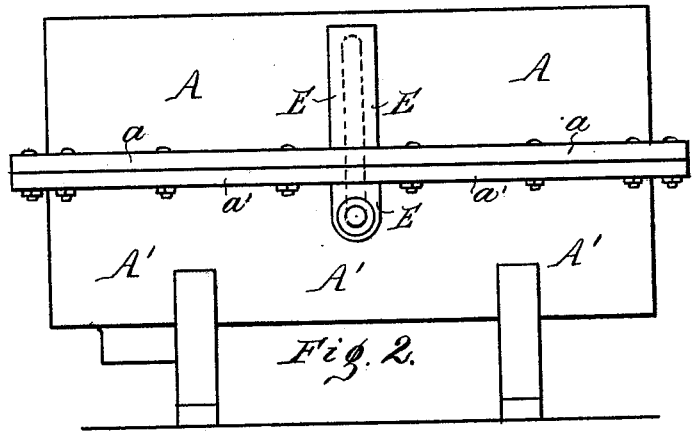

In the drawings, Figure 1 is a sectional elevation, showing the operating parts within the water-chamber, Fig. 2 being a side elevation, showing more specially the side pipe with which the steam-pipe connection is made.

The two sectional parts A A' of the apparatus are united by bolts passing through thin flanges $a\ a'$, (see figures,) forming a water-tight joint. The apparatus within is divided by a false bottom, B, forming the top chamber $B^1$ and the lower discharge-chamber $B^2$. (See Fig. 1.) On the false bottom B, I provide my improved operating parts, as follows: C is a lever, having its fulcrum at $c$ on a standard, $c'$. (See Fig. 1.) The long arm of the lever I provide with a suitable float, D; also, at $d$ on the long arm of the lever, I pivot the stem of a valve, $d^1$, which controls a valve-port formed in the false bottom B. (See Fig. 1.) On the short arm of the lever I also pivot, at $d^2$, the stem of a similar valve, $d^3$, which controls a like valve-port formed in the bottom B. (See Fig. 1.) As shown, the valves $d^1\ d^3$ are oppositely positioned—that is, the valve $d^1$ closes and opens its seat from the top, while that of $d^3$ closes and opens its seat from below. It is this arrangement of the valves and their connection to a float that enables me to insure a reliable action on part of the float, and consequent full discharge from the water-chamber, and otherwise render the trap self-acting. The leverage of the valves being equidistant from the fulcrum, and the pressure within the water-chambers being upon the valves, these, in their action, counterbalance each other. Thus the pressure-top of the valve $d^1$, which tends to close said valve on its seat, is counterbalanced by the pressure-top of the valve $d^3$, which tends to open said valve, and hence, an equilibrium of these valves being thus achieved, the operation of the float is rendered more decisive, perfect, and reliable, and a consequent better, safer, and surer opening and closing action of the valves achieved in accordance with the accumulation of water in the water-chamber.

It is frequently desirable (and for purposes of repair or to get at the inside of the apparatus it is a necessity) to disconnect one section, A, from that of A'. The joint of the apparatus with the steam-pipe, however, as ordinarily done, renders the attainment of the object just stated difficult. My object and purpose are, therefore, to so connect the steam-pipe to my trap that the former in its connection shall not interfere with the proper repairing of the trap; hence I connect the steam-pipe as follows: E (see Fig. 2) represents a side pipe; or, as indicated, the casting of the sections A A' can have a cored port in the place of a side pipe. Part of the pipe or core E extends below the flanges; thence it passes through said flanges up along the side of the trap, to communicate at top within the interior of the water-chamber. (See figures.) To the lower end of this side pipe or cored port the steam-pipe connects. This latter, as is apparent by this construction, can readily be connected or disconnected, and its joint in no way interferes with the taking apart of the trap.

E' is an air-valve to close or open its seat in the bottom B. Its stem is provided with a spiral spring, so that it will keep the valve open until pressure from top closes it on its seat. The stem of the valve is guided in frame or housing $e$, the purpose of this air-valve being to permit a free escape of the air from the water-chamber; hence, as the spring keeps the valve open, the air escapes at the same time that water enters to fill the trap, and preparatory to the operation of same. The air being passed out below the pressure of the water accumulating is sufficient to keep said valve down on its seat, and thus the trap is in operative condition. This air-valve, therefore, further renders the trap self-acting in this, that at the very start any accumulation of water taking place can freely enter the trap to raise the float, and be discharged from the apparatus.

What I claim is—

1. The air-valve E', as shown and described, n combination with the bottom B, the upper chamber B¹, and lower chamber B², said valve being kept open by its spring, and closing by the pressure of steam or water in said upper chamber, substantially as set forth.

2. The combination of the side pipe or core E, sections A A′, having flanges $a$ $a'$, water-chamber B¹, discharge-chamber B², bottom B, and the valves $d^1$ $d^3$, lever C, float D, and air-valve E′, all arranged to operate in the manner and for the purpose set forth.

In testimony of said invention I have hereunto set my hand.

JOSEPH RYAN.

Witnesses:
WILLIAM W. HERTHEL,
CHAS. F. MEISNER.